UNITED STATES PATENT OFFICE.

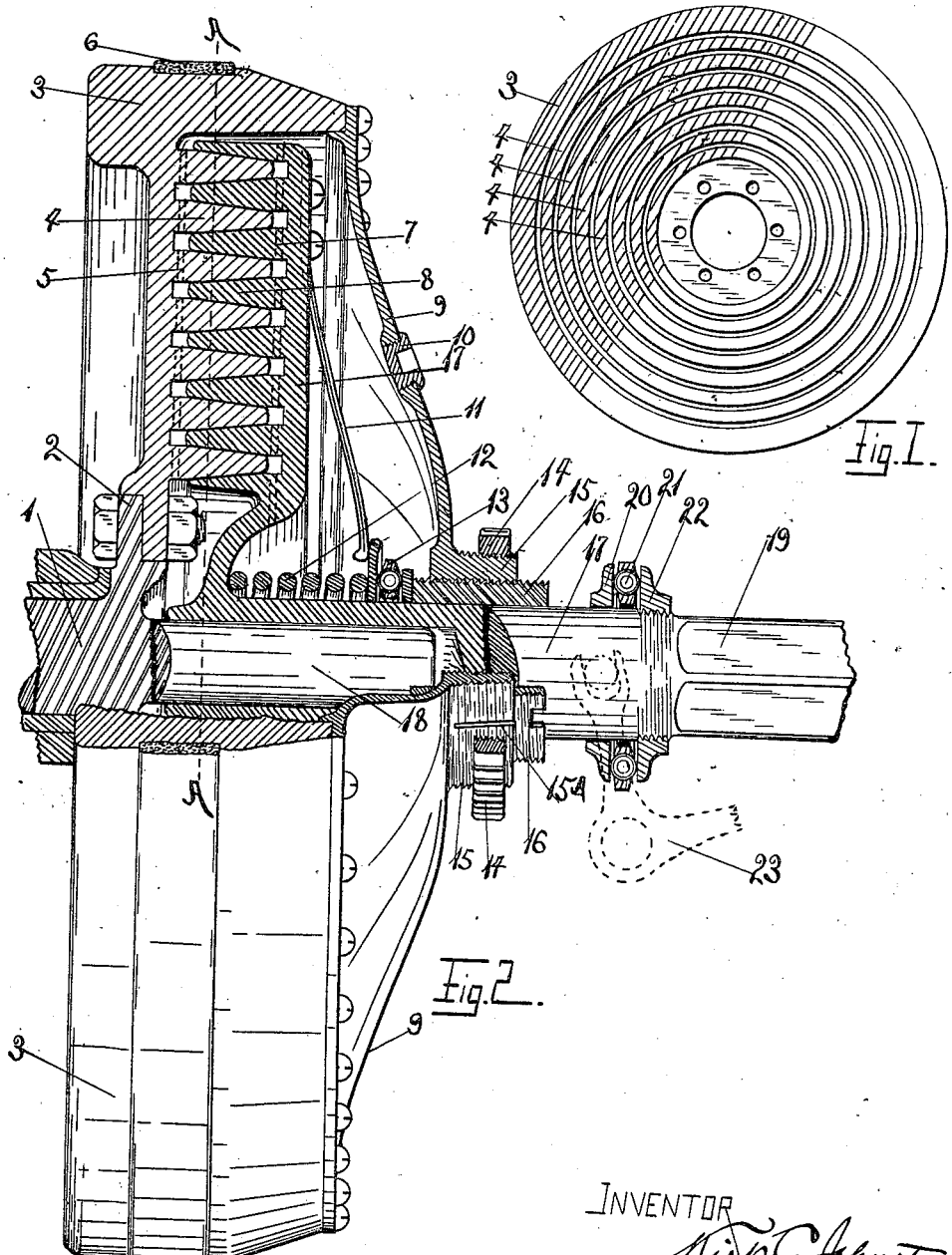

KIRK G. JOHNSTON, OF NEW YORK, N. Y.

FRICTION-CLUTCH.

No. 896,389.     Specification of Letters Patent.     Patented Aug. 18, 1908.

Application filed August 12, 1907. Serial No. 388,152.

*To all whom it may concern:*

Be it known that I, KIRK G. JOHNSTON, a citizen of the United States, residing at No. 61 East Twenty-fifth street, in the city of New York, county of New York, and the State of New York, have invented a new, novel, and useful Friction-Clutch, of which the following is a specification.

My invention relates to improvements in friction clutches primarily for automobile work but susceptible of being used in connection with any machinery; and the objects are, first, to provide a friction clutch susceptible of gradual engagement and of great holding strength when finally engaged, second, to provide a friction clutch of great strength that can be easily and quickly thrown in or out of engagement, third, to provide a friction clutch of simple and strong construction and of few parts. These objects are attained by the mechanism illustrated in the accompanying drawing, which is made a part of this specification, and in which:—

Figure 1 is a sectional view of the driving member of the friction clutch substantially on the dotted line A—A of Fig. 2; this figure is only partly shaded and is a reduction in size of Fig. 2; Fig. 2 is a view of all members of the friction clutch, partly in section.

Similar numerals refer to similar parts throughout the several figures of the drawing—

As shown, the driving member of the friction clutch is an integral part of the balance wheel 3, which is attached to the flange or collar 2 on the shaft 1, the friction portions being the circularly disposed cones 4 through which are drilled small oil passages 5; a leather or other friction band 6 is attached to the balance wheel for the purpose of driving auxiliary devices. A casing 9 is hermetically attached to the balance wheel 3, is provided with an oil hole and cap 10 and carries at its center a sleeve 15; said sleeve is split as at 15ᴀ and is provided with a tapering thread on its outside periphery on which is fitted the binding nut 14 which locks in adjustment the bearing sleeve 16. Said sleeve 15 has an internal thread and acts as a holder for the spring (12 and 11) adjusting sleeve 16 in which is journaled the driven member 17; a ball thrust bearing 13 is provided between the said sleeve bearing 16 and the springs 11 and 12. The driven member 17 is journaled on the pin extension 18 of the shaft 1 and is provided with a plurality of circularly disposed cones 8 adapted to exactly fit between the similar cones 4 on the driving member 3 and containing small oil passages 7; the driven member 17 of the friction clutch is also provided with means 20, 21, 22 and 23 of being disengaged from the driving member 3 and its end 19 is squared or otherwise provided to transmit rotary motion to any connection made thereto.

In operation, the several cones on the members of the friction clutch having been accurately fitted, the space inclosed by the case 9 is filled with oil of previously determined gravity; the driven member 17 is held out of engagement until all is ready to start the machine when it is released and through the action of the springs 11 and 12 is very gradually engaged on account of the necessity of driving all oil from the spaces between the several cones 4—4 and 7—7. Until all oil is expelled the clutch will pull on oil. When the oil is entirely expelled and the clutch fully engaged the large frictional surface and the metal to metal contact give great resistance against any tendency to slip on the part of the members 3 and 17. A very slight withdrawal of the member 17 will release the clutch as the surfaces are now free from oil but will at once become oiled when the members are separated. It is obvious that for stationary work, if desired, other means of engaging the clutch may be employed, such as ball and dogs.

Although the accompanying drawing discloses the preferred embodiment of my invention it is obvious that the parts are susceptible of modification especially as to the angle and the number of the circular cones, and as to the means of engaging and disengaging the members.

Having thus described my invention I claim as new, novel and useful and desire to secure by Letters Patent—

1. In a friction clutch the combination of a driving member, upon the face of which are constructed a plurality of circularly disposed concentric cones; a pin or pivot projecting from the center of said driving member; a driven member, upon the face of which are constructed a plurality of circularly disposed concentric cones adapted to fit into the spaces between the similar cones on the said driving member, slidably mounted on the said pin; a pin or shaft projecting from the center of said driven member, and rigidly attached thereto; a plate member hermetically attached to the rim of the said driving member, and journaled on the projecting shaft from the said driven member, thus forming an oil-tight casing for the said members; and means of sliding the shaft projecting from the said driven member, thus engaging or disengaging the said members, substantially as and for the purpose set forth.

2. In a friction clutch; the combination of two main members each of which is composed of a series of circularly disposed cones adapted to fit into the spaces between the similar cones on the other member, a casing hermetically attached to the rim of one member carrying at its center a longitudinally adjustable sleeve adapted to be locked into adjustment and journaled on the shaft of the other member, springs pressing said second member from said adjustable sleeve bearing and means of sliding said second member against the tension of said spring and out of engagement with said first member, as and for the purpose set forth.

In testimony whereof I have signed this specification in the presence of the two subscribing witnesses.

KIRK G. JOHNSTON

Witnesses:
   E. P. McGovock,
   Rufus Howard.